United States Patent [19]

Gotchel

[11] 4,365,425

[45] Dec. 28, 1982

[54] CONTROLLED CURING OF AIR-PERMEABLE BONDED WEBS

[75] Inventor: Joel P. Gotchel, Delaware County, Pa.

[73] Assignee: Scott Paper Company, Philadelphia, Pa.

[21] Appl. No.: 272,057

[22] Filed: Jun. 9, 1981

[51] Int. Cl.³ .......................................... F26B 21/12
[52] U.S. Cl. ...................................... 34/54; 34/115; 34/155; 118/68
[58] Field of Search ................. 118/67, 68; 34/51, 54, 34/43, 155, 115; 73/38

[56] References Cited

U.S. PATENT DOCUMENTS

| | | | |
|---|---|---|---|
| 3,371,518 | 3/1968 | Keyes ...................................... | 73/38 |
| 4,215,489 | 8/1980 | McMahon, Jr. ...................... | 34/242 |
| 4,311,037 | 1/1982 | Gotchel et al. ......................... | 73/38 |
| 4,326,342 | 4/1982 | Schregenberger ..................... | 34/54 |

*Primary Examiner*—Larry I. Schwartz

*Attorney, Agent, or Firm*—Joseph H. Yamaoka; John W. Kane, Jr.

[57] ABSTRACT

Apparatus for curing a bonded, air-permeable web. The apparatus includes drying means (16–26, 42, 48, 54, 56 and 80) for passing heated air at a predetermined temperature through the web 10 for a predetermined time. Means (128, 132, 134, 136, 150, 160, 164 and 166) are provided for generating a first signal representing the pressure drop, at a predetermined velocity, across the web 10 outside of the drying means (16–26, 42, 48, 54, 56 and 80). Means (68, 108 and 110) are also provided for generating a second signal representing the pressure drop across the web (10) inside the drying means (16–26, 42, 48, 54, 56 and 80). Means (120) responsive to the first and second generated signals control the velocity of the heated air passing through the web so as to maintain the pressure drop across the web 10 inside the drying means (16–26, 42, 48, 54, 56 and 80) equal to the pressure drop as measured by the means (128, 132, 134, 136, 150, 160, 164 and 166) for generating the first signal.

4 Claims, 1 Drawing Figure

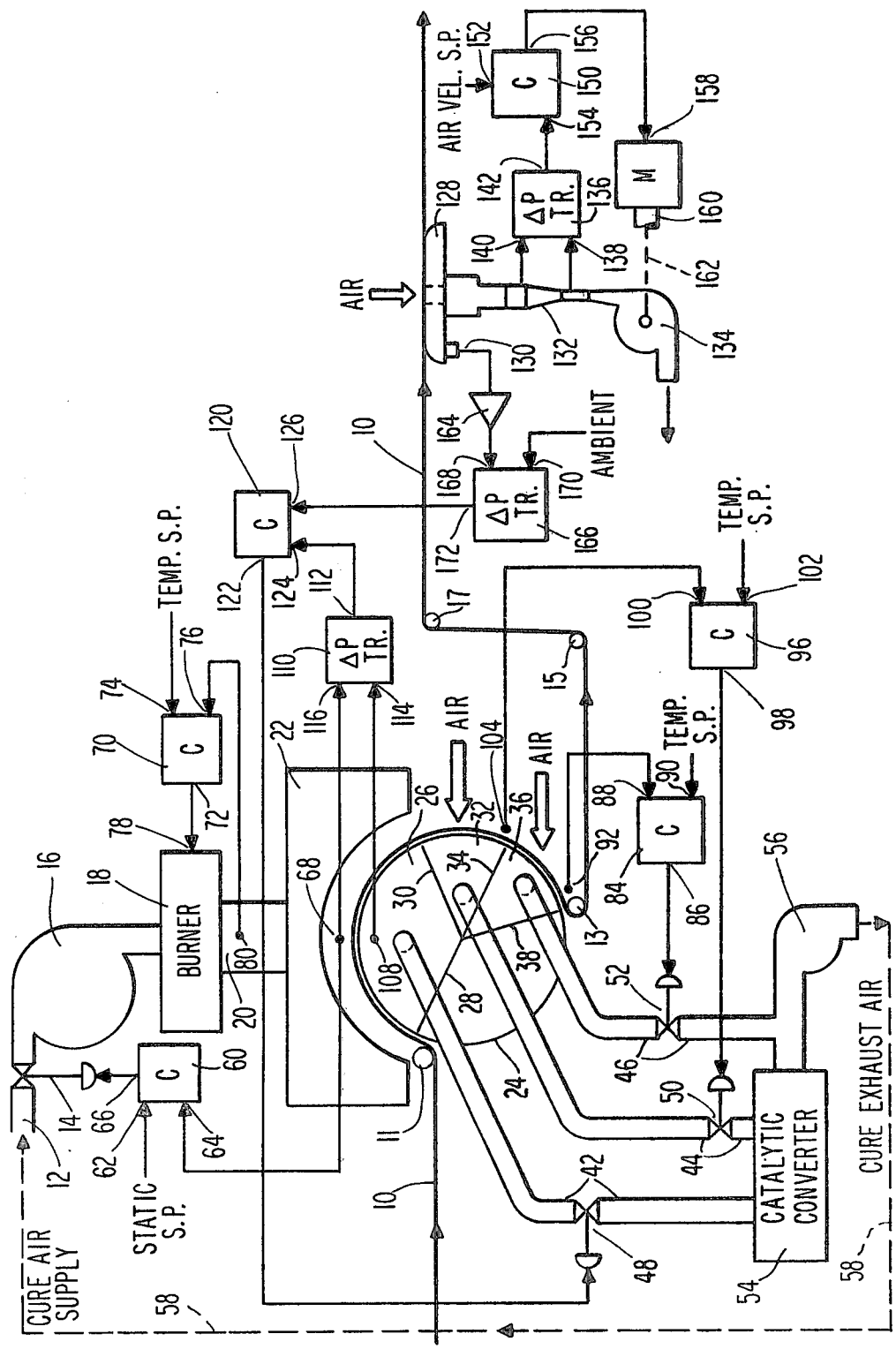

CONTROLLED CURING OF AIR-PERMEABLE BONDED WEBS

TECHNICAL FIELD

This invention relates to apparatus for curing an adhesively bonded, air-permeable web by passing heated air through the web. More particularly, this invention is directed to a curing apparatus that includes a dryer for passing air, heated to a predetermined temperature, through the web for a predetermined time and wherein the pressure drop across the web in the dryer is controlled so as to maintain a desired velocity of the heated air passing through the web.

BACKGROUND ART

Many processes for making water formed paper webs or dry formed nonwoven webs include the application of a bonding material to the web to give the web either stability or strength. In such cases, it is often necessary to set or cure the bonding material by raising the temperature of the bonded web. One example of such a process is described in U.S. Pat. No. 3,879,257, issued to Victor R. Gentile, et al, and assigned to the assignee of this invention.

One method for curing a bonded, air-permeable web is to transport the web through a curing dryer in which heated air is passed through the web. In such a dryer, the three primary parameters that affect the degree of cure of the bonding material are the dwell time of the web in the curing dryer, the temperature of the air passing through the web and the velocity of the heated air passing through the web. Typically, the dwell time of the web in the curing dryer is constant because the web travels at a constant speed through the dryer, the temperature is controlled to a predetermined temperature, and the air flow control valve is set to a prescribed position to effect curing of the web. In the prior art curing systems, these parameters were adjusted manually by an operator who tests the degree of cure of the finished web and who changes either the temperature setting or air flow setting based on his observation. The cure test is usually performed by the operator after a parent roll of the finished web has been completed, which in a wet formed papermaking process occurs about once every 10 or 15 minutes. One problem with a manually controlled curing system is that certain properties of the web can change over relatively short periods of time. For example, if the web is a wet formed paper web, either the basis weight or the bulk of the web can change over relatively short periods of time (measured in seconds), either because of changes in the papermaking process itself, or because either the chemical or fiber composition of the furnish in the wet end changes. Changes in the bulk, basis weight or fiber composition of the web usually results in a change in the permeability of the bonded web which in turn, for a given air flow, affects the velocity at which the heated air passes through the web while it is in the curing dryer. The primary problem associated with attempting to provide on-line control of the parameters that affect the degree of cure of the web is the fact that it is extremely difficult to directly measure the velocity of the heated air passing through the web in the dryer. The reason for this difficulty is that, due to leaks and losses, it is not possible to obtain an accurate measure of the actual volume of heated air passing through the web, and because of variations in the trim of the web it is not possible to accurately measure the area of the web through which the heated air passes.

Thus, it can be seen that it would be desirable to have a curing apparatus in which heated air is passed through the web for a predetermined time and a predetermined temperature, and in which a property of web is measured and used to control the flow of heated air through the web in the dryer so as to maintain a desired velocity of the heated air through the web.

DISCLOSURE OF INVENTION

A web, to which has been applied a known amount of bonding material, is cured by passing heated air at a predetermined temperature and at a predetermined velocity through the web for a predetermined length of time. It has been found for certain types of webs, that if the velocity of the heated air passing through the web is plotted against the dwell time of the web in the curing dryer to achieve complete cure (i.e., 92-95% cure), at a number of different temperatures, a family of curves results. It has further been found that these curves are not significantly affected by changes in certain properties of the web such as basis weight or bulk, or if the web is a wet formed paper web, by the chemical or fiber composition of the furnish. Thus, for example, even through the basis weight of the web changes, if the time that the web remains in the curing dryer remains constant, and the temperature of the heated air passing through the web is maintained at the desired level to affect cure, and the velocity of the heated air passing through the web is maintained at the desired level, the bonding material will be completely cured.

In accordance with the invention, the dwell time of the bonded web in the curing dryer is constant as determined by the speed of the web traveling through the dryer, and the temperature of the heated air passing through the web is also maintained at a predetermined constant value. An on-line web permeability measuring device, placed at a convenient location external to the curing dryer, measures the pressure drop across the web when air is pulled through the web at the velocity desired to be maintained in the curing dryer. The pressure drop across the web in the curing dryer is also measured and a controller, responsive to the measured pressure drop across the web in the curing dryer and to the measured pressure drop across the web external to the dryer, adjusts the flow of air through the curing dryer so as to maintain the pressure drop across the web in the dryer equal to the pressure drop across the web as measured by the on-line permeability measurement device external to the dryer.

In another aspect of the invention, the on-line web permeability measurement device external to the dryer measures the pressure drop across the web at a known velocity that is less than the desired velocity to be maintained within the curing dryer. Circuit means responsive to the static pressure measured by the permeability measurement device and to the ambient pressure above the web extrapolates the permeability measurement to provide a signal representative of the desired pressure drop to be maintained across the web in the curing dryer.

BRIEF DESCRIPTION OF THE DRAWING

While the specification concludes with claims particularly pointing out and distinctly claiming that which is regarded as the present invention, the objects and advantages of this invention can be more readily ascertained from the following description of a preferred embodiment when read in conjunction with the accompanying FIG. which is a block diagram of the apparatus for controlling the curing of an air-permeable, bonded web.

BEST MODE FOR CARRYING OUT THE INVENTION

As shown in the FIG., an air-permeable, bonded web 10 is traveling over guide rolls 11, 13, 15 and 17 through the curing apparatus of this invention to a reel (not shown) where it is rolled into a parent roll. In a preferred embodiment, web 10 is a wet formed web of papermaking fibers, both sides of which have been printed with bonding material and creped as taught in U.S. Pat. No. 3,879,257-Gentile, et al, issued on Apr. 22, 1975. The curing dryer system includes a hood 22 and a rotating, cylindrical section 24. The surface of the cylindrical section 24 of the dryer can be perforated or can have a honeycomb structure so that heated air can pass through the cylindrical surface. Mounted within the rotating cylinder 24 are stationary baffle members 28, 30, 34 and 38. The rotating cylinder 24 along with baffles 28 and 30 define a curing section 26 of the dryer; the rotating cylinder 24 along with baffles 30 and 34 define a precool section 32 of the dryer; and the rotating cylinder 24 along with baffles 34 and 38 define a cool section 36 of the dryer.

A blower 16 pulls unheated curing air through a duct 12 and control valve 14. The unheated curing air is heated by means of a burner 18. The heated air flows through duct 20 and dryer hood 22, then passes through the web 10 into the curing section 26 of the dryer. As the heated air passes through the web 10, the temperature of the bonded web 10 is elevated and the bonding material is cured. The heated curing air which now contains smoke and other contaminants is exhausted through a duct 42 and control valve 48 into a catalytic converter 54 which cleans the exhaust air. As the web 10 passes over the precool zone 32 of the dryer, ambient air is pulled through the web, then through the rotating cylinder 24 into the precool section 32 of the dryer. This precooled exhaust air, which also contains some contaminants, is exhausted through duct 44 and control valve 50 into the catalytic converter 54. As the web passes over the cooling section 36 of the dryer, more ambient air is pulled through the web into the cool section 36 of the dryer. Since the exhaust air from the cool section 36 of the dryer does not contain any significant quantity of contaminants, it is exhausted by way of duct 46 and control valve 52 into the intake of an exhaust fan 56. The clean air coming out of the catalytic converter 54 is also fed into the intake of exhaust fan 56. The clean exhaust air which exits from the exhaust fan 56 can either be vented to the atmosphere or, as indicated by dashed line 58, all or a part of the clean exhaust air can be fed back into the intake duct 12 for the curing dryer.

In this curing apparatus, it is desirable to maintain a known, constant temperature of the cured web 10 as it leaves the precool section 32 of the dryer. The temperature of the web 10 can be controlled by either opening control valve 50 to allow more cooling air to pass through the web or by closing the valve slightly to reduce the amount of cooling air which passes through the web into the precool section 32 of the dryer. Thus, as shown in the figure, control valve 50 is operated from the output 98 of a controller 96. The desired temperature of the web as it exits the precool section 32 of the dryer is manually entered by an operator as a temperature set point at input 102 of controller 96. A temperature sensor 104 located adjacent to the cured web 10 at the exit point of the precool section 32 of the dryer provides a signal that is representative of the actual temperature of the web 10. The signal from temperature sensor 104 is applied to input 100 of controller 96. Controller 96 then operates valve 50 so as to maintain the temperature of the web 10 at the exit point of the precool section 32 of the dryer at the desired set point temperature. In a similar manner, the temperature of the web 10 as it leaves the cool section 36 of the dryer is maintained at a constant, desired temperature by using control valve 52 to regulate the amount of air that flows through the cooling section 36 of the dryer. Thus, control valve 52 is controlled from the output 86 of a controller 84. The desired temperature of the cured web 10 as it leaves the cool section 36 of the curing dryer is manually entered by an operator as a temperature set point at input 90 of controller 84. A temperature sensor 92 located adjacent to the cured web 10 at the exit of the cool section 36 of the curing dryer provides a signal representing the actual temperature of the cured web 10 to input 88 of controller 84. The controller 84 then operates control valve 52 so as to maintain the temperature of the web 10 at the desired set point temperature as it exits the cooling section 36 of the curing dryer.

Since it is desired to maintain a constant temperature of the heated curing air, the temperature control input 78 of burner 18 is operated from the output 72 of a controller 70. The desired temperature of the curing air is controlled manually by an operator as a temperature set point at input 74 of controller 70. A temperature sensor 80 located in the flow path of the heated air provides a signal representative of the actual temperature of the heated curing air at input 76 of controller 70. Controller 70 adjusts the burner temperature so as to maintain the temperature of the heated curing air at the desired set point temperature.

It is highly desirable to maintain a slightly negative static pressure at the high pressure side of the web 10 within the curing dryer first of all, to prevent smoke or other contaminants from escaping from the dryer into the area surrounding the curing station and secondly to prevent inefficiency caused by the loss of heated air from the dryer. To accomplish this, control valve 14 is controlled by the output 66 of a controller 60. The desired negative value of static pressure to be maintained above the web 10 is set in manually as a static pressure set point at input 62 of controller 60. A static pressure sensor 68 located just above the surface of the web 10 provides a signal, representative of the actual static pressure above the web 10, to input 64 of controller 60. The controller 60 then operates the control valve 14 so as to maintain the static pressure above the web at the desired static pressure set point. Since there is a considerable variation in the static pressure above the web at different locations in the hood, it is preferred to obtain an average reading of static pressure. Thus, in one embodiment, the pressure sensor 68 was a piezometer grid consisting of two stainless tubes having a diameter of 0.953 centimeters, aligned in the cross direction of the web 10 and spaced 20.32 centimeters apart in the machine direction. Diametrically opposed holes perpendicular to the air flow and having a diameter of 0.071 centimeters are drilled into the tube with a spacing along the length of the tube of 10.16 centimeters. The two tubes are oriented over the web so that all the holes are located approximately 2.54 centimeters above the surface of the web 10. The two tubes are interconnected to provide an average reading of the static pressure over the entire effective hood area of the dryer.

The velocity of the heated curing air through the web 10 is controlled through the adjustment of control valve 48. Control valve 48 is operated from the output 122 of a controller 120. A pressure sensor 108 located adjacent the low pressure side of web 10 provides a signal to input 114 of a differential pressure transducer 110 that is representative of the static pressure beneath the web 10. The pressure sensor 108 can be a piezometer ring similar in construction to pressure sensor 68 or can be a plurality of pitot tubes, located at different positions under web 10, all connected together to provide an average reading of the static pressure beneath the web 10. The output of pressure sensor 68 is applied to input 116 of differential pressure transducer 110. The output 112 of differential pressure transducer 110, which is a signal representing the actual pressure drop across the web 10 in the dryer, is applied to input 124 of controller 120. There is provided at the other input 126 of controller 120 a signal generated from the output 172 of a differential pressure transducer 166 which measures the pressure drop across the cured web 10 that occurs when air is passed through the web 10 at the velocity that is desired to be maintained within the curing dryer. Although any known method for measuring this differential pressure can be employed, it is preferred to employ a differential pressure measurement apparatus as described in my co-pending patent application, Ser. No. 131,803, filed Mar. 19, 1980 now U.S. Pat. No. 4,311,037, which is incorporated herein by reference. The cured web 10 passes over a static pressure measuring device 128 which includes an aperture 129 through which air from above the web 10 can be pulled through the web 10 and into the static pressure measuring device 128. The output 130 of static pressure measuring device 128 is a signal representative of the static pressure under the cured web 10. A fan 134 driven by the shaft 160 of a motor as indicated by dashed line 162 pulls air through the aperture 129 of the pressure measuring device 128. The pressure differential developed across a venturi 132 is applied to inputs 138, 140 of a differential pressure transducer 136. The output 142 of differential pressure transducer 136, which is a signal that is proportional to the velocity of the air flowing through the web 10 and through slot 129, is applied to an input 154 of a controller 150. The desired velocity of the heated curing air through the web 10 in the curing dryer is manually set in by an operator as an air velocity set point at input 152 of controller 150. The output 156 of controller 150 is applied to input 158 of the motor which controls the speed, and therefore the velocity of air being pulled through the cured web 10 and slot 129 of the pressure measuring device 128. Controller 150 maintains the velocity of the air being pulled through the cured web 10 and slot 129 at the air velocity set point value established by the operator at the input 152 of controller 150. The signal appearing at the output 130 of the static pressure measuring head 128, which is representative of the static pressure immediately below the cured web 10 within the slot 129, is applied through an amplifier 164 to input 168 of a differential pressure transducer 166. The signal applied to input 170 of differential pressure transducer 166 is representative of the ambient static pressure above the cured web 10. Thus, the output 172 of differential pressure transducer 166 is a signal that is representative of the actual pressure drop across the cured web 10 that results when air flows through the web at the desired curing velocity. The output of differential pressure transducer 166 is applied to input 126 of controller 120. Controller 120 operates the flow control valve 48 so as to maintain the differential pressure across the web 10 in the curing dryer to be equal to the differential pressure developed across the cured web 10 external to the curing dryer.

It may be desirable to measure the differential pressure across the cured web 10 at an air velocity substantially less than the air velocity desired within the curing dryer. In that case, the operator would manually establish a lower air velocity set point at the input 152 of controller 150 and the gain characteristic of amplifier 164 would provide any needed compensation to extrapolate the signal at the output 130 of the pressure sensing head 128 in order to provide the appropriate signal to the input 168 of differential pressure transducer 166.

By way of example, a web having a basis weight of 0.051 kilograms per square meter (30 pounds per ream of 2880 square feet) containing 8% by weight of bonding material has been cured on a dryer having a drum diameter of 0.61 meters (2 feet). The web traveled through the curing dryer at 121.9 meters per second (400 feet per minute) over a curing zone 26 of 0.61 meters (2 feet) so that the dwell time in the curing zone 26 is 0.3 seconds. The temperature of the air passing through the web was 260 degrees Celsius and the desired velocity of the heated air through the web was 2.13 meters per second (7 feet per second). A negative static pressure above the web in the curing dryer was maintained at 0.00254 meters (0.1 inches) of water. The pressure drop across the web in the curing cryer varies around 0.03 meters (1.5 inches) of water. The temperature of the web in the curing zone reaches about 210 degrees Celsius. The precool zone length was 0.61 meters (2 feet) and the temperature of the web in the precool zone is about 176.6 degrees Celsius. The cooling zone length was 0.5 meters (1.67 feet) and the temperature of the web in the cooling zone is about 43.3 degrees Celsius.

In a process in which the bonded web 10 entering the curing dryer contains moisture and uncured bonding material, it is preferred to measure the differential pressure developed across the web 10 when air with a known velocity is passed through the web, after the web emerges from the curing dryer. If the web is dry as it enters the curing dryer, it will be recognized by those skilled in the art that the differential pressure measurement of the web 10 external to the dryer could be performed on the uncured web 10.

While the present invention has been described with reference to a specific embodiment thereof, it will be obvious to those skilled in the art that various changes and modifications may be made without departing from the invention in its broader aspects. For example, although the invention has been described in terms of air being pulled through the web to measure the differential pressure developed across the web outside of the curing dryer and heated air has been described as the gas that is used to cure the web, it will be clear to those skilled in the art that depending on the nature of the process, other equivalent gases may be employed to cure webs or to measure the differential pressure drop developed across the web outside of the dryer.

What is claimed as new and desired to be secured by Letters Patent of the United States is:

1. Apparatus for curing a bonded, air-permeable web comprising:
    (a) drying means for controllably passing heated air at a predetermined temperature through the web for a predetermined time;
    (b) means for generating a first signal representing the pressure drop, at a predetermined velocity, across the web outside of the drying means;
    (c) means for generating a second signal representing the pressure drop across the web inside the drying means; and
    (d) means, responsive to the first and second signals, for controlling the passing of the heated air through the web so as to maintain the pressure drop across the web inside the drying means equal to the pressure drop as measured by the first signal generating means.

2. An apparatus as recited in claim 1 further comprising:
    (a) means for generating a third signal representing the static pressure at the high pressure side of the web in the curing apparatus; and
    (b) means, responsive to the third signal, for controlling the flow of heated air through the web so as to maintain the high pressure side of the web at a slightly negative pressure with respect to the ambient pressure outside the drying means.

3. Apparatus for curing a bonded, air-permeable web comprising:
    (a) drying means for controllably passing heated air at a predetermined temperature through the web for a predetermined time;
    (b) means located outside of the drying means for passing air at a predetermined velocity through the web and for generating a first signal that is a function of the static pressure on the low pressure side of the web;
    (c) means responsive to the static pressure on the high pressure side of the web at said outside location and to the first signal for generating a second signal representing a desired pressure drop across the web inside the drying means;
    (d) means for generating a third signal representing the pressure drop across the web inside the drying means; and
    (e) means, responsive to the second and third signals, for controlling the passing of the heated air through the web so as to maintain said desired pressure drop across the web inside the drying means.

4. An apparatus as recited in claim 3 further comprising:
    (a) means for generating a fourth signal representing the static pressure at the high pressure side of the web in the curing apparatus; and
    (b) means, responsive to the fourth signal, for controlling the flow of heated air through the web so as to maintain the high pressure side of the web at a slightly negative pressure.

* * * * *